United States Patent [19]

Ames

[11] 4,159,287
[45] Jun. 26, 1979

[54] MODIFIED AMORPHOUS POLYOLEFIN BASED HOT-MELT ADHESIVES

[75] Inventor: William A. Ames, Longview, Tex.

[73] Assignee: Eastman Kodak Company, Rochester, N.Y.

[21] Appl. No.: 917,694

[22] Filed: Jun. 21, 1978

[51] Int. Cl.² ........................................... C08F 255/02
[52] U.S. Cl. ................................. 260/878 R; 428/511
[58] Field of Search ..................................... 260/878 R

[56] References Cited

U.S. PATENT DOCUMENTS 3,859,385   1/1975   Mainord ........................... 260/878 R Primary Examiner—Stanford M. Levin
Attorney, Agent, or Firm—Clyde L. Tootle; Daniel B. Reece, III

[57] ABSTRACT

The hot-melt adhesives of the present invention comprise amorphous polyolefins grafted with carboxyl monomers and modified with tetra alkyl ammonium hydroxide compounds and pivalolactone. These hot-melt adhesive compositions have a novel combination of properties such as elevated temperature shear properties.

13 Claims, No Drawings

MODIFIED AMORPHOUS POLYOLEFIN BASED HOT-MELT ADHESIVES

This invention relates to hot-melt adhesive compositions having a novel combination of properties. More specifically, the invention relates to hot-melt adhesive compositions comprising modified, amorphous polyolefins which provide an adhesive having improved elevated temperature shear properties.

Hot-melt adhesives produce a bond by mere cooling as distinguished from crosslinking or other chemical reactions. Prior to heating, the hot-melt adhesives are solids that can be prepared in bulk or pellet form for ease of handling. Upon heating, the hot-melt adhesive composition melts and flows freely for application to a substrate. Since the hot-melt adhesives of the present invention are thermoplastic rather than thermosetting, and thus remeltable, they can be applied to a particular substrate and later remelted to form a hot-melt bond between this substrate and another substrate.

Hot-melt adhesives are useful for bonding various substrates together such as wood, paper, plastics, and textiles, as well as other materials. One use for which they are well suited is the fabrication of corrugated paperboard, and for cardboard case sealing and closing. Hot-melt adhesives useful for producing corrugated paperboard must have high bond strength under conditions of high elevated temperature shear and are particularly useful where extremes of temperature are encountered in transportation and storage, particularly in warehouses.

Accordingly, it is one of the objects of the present invention to provide a new amorphous polyolefin hot-melt adhesive. Another object of this invention is to provide new modified amorphous polyolefin hot-melt adhesives which can be applied by means of conventional hot-melt applicators. A further object of the invention is to provide new modified amorphous polyolefin hot-melt adhesives affording improved shear properties at elevated temperatures. A still further object of this invention is to provide new modified amorphous polyolefin-based hot-melt adhesives which are suitable for structural and product assembly applications. Still another object of the invention is to provide grafted amorphous polyolefin based hot-melt adhesives which can be maintained in the molten state for long periods of time with little or no significant change in melt viscosity.

In accordance with this invention, it has been found that amorphous polyolefins can be grafted with unsaturated alkyl carboxylic acid components in the presence of free-radical initiators to provide modified amorphous polyolefins. These modified amorphous polyolefins are partially neutralized with a tetraalkyl ammonium hydroxide to form a partial salt of the modified amorphous polyolefin. The partially neutralized modified amorphous polyolefin is then reacted with pivalolactone in an amount of from about 5 to about 40 percent by weight to provide a grafted amorphous polyolefin based hot melt adhesive. If the pivalolactone is used in an amount greater than 40 percent by weight, the grafted polymer exhibits some of the properties of polypivalolactone such as a high mold shrinkage. If the pivalolactone is used in an amount less than 5 percent by weight, the grafted modified polyolefins do not have the necessary elevated temperature shear properties.

The grafting of the unsaturated alkyl carboxylic acid component to the amorphous polyolefin of this invention is carried out by grafting the unsaturated acid component to the amorphous polymers in the presence of a free-radical initiator. The preferred initiators are the alkyl and acyl peroxides, such as di-tert-butyl peroxide, 2,5-dimethyl-2,5-di(tert-butylperoxy)hexane, benzoyl peroxide, lauroyl peroxide, and the like, which are efficient in the abstraction of hydrogen from the polymer chain.

The grafting reaction may be conducted in either batch or continuous operations. Unreacted monomer or unsaturated carboxylic acid component can be recovered and reused in a subsequent reaction. The reaction may be carried out in solution or in the melt phase. In general, the grafting reaction is carried out using from 1.5 to 5 parts of peroxide/100 parts of polymer, although higher or lower amounts may be used depending upon the particular peroxide employed. The amount of unsaturated alkyl carboxylic acid component used depends upon the amount of carboxyl groups desired in the graft polymer. Usually about 5 to about 20 parts of monomer/100 parts of amorphous olefin polymer are satisfactory to provide graft polymers. The graft polymerization may be carried out conveniently at temperatures in the range of 140° C. for solution type processes to 225° C. for melt phase processes. In general, the contact time may be varied over a wide range; but generally it is desirable to use a contact time at least 6 times the length of the half-life of the peroxide (or other free-radical initiator) at the temperature of the reaction.

The amorphous polyolefin useful in this invention is an essentially noncrystalline hexane soluble polyolefin, such as amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid amorphous polypropylene has a melt viscosity of about 1,000 to about 50,000 centipoise at 190° C. (ASTM D-1519), and preferably from about 1,500 to about 15,000 centipoise at 190° C. The solid amorphous polypropylene also has a Ring and Ball softening point of about 90 to about 110, preferably about 95 to about 105. The amorphous polyolefin can contain crystalline, hexane insoluble polyolefin up to an amount of about 30 weight percent. One such commercially available amorphous polyolefin useful in the present adhesives is the Eastobond M-5 amorphous polyolefins available from Eastman Chemical Products, Inc. The amorphous polyolefin component can also be an amorphous, hexane soluble propylene-alpha-monoolefin copolymer. These amorphous copolymers are formed in varying amounts during the production of crystalline propylene-alpha-monoolefin copolymers by stereospecific polymerization of propylene and a different alpha-monoolefin by a process as disclosed in U.S. Pat. No. 3,529,037, incorporated herein by reference. These amorphous copolymers can also contain various amounts of hexane insoluble polymer up to an amount of about 30 weight percent. The amorphous polyolefin can be degraded to any desired melt viscosity if one starts with a high molecular weight polymer.

Suitable unsaturated carboxylic acid components are unsaturated polycarboxylic acid esters and anhydrides such as, for example, maleic acid, maleic anhydride, fumaric acid, citraconic anhydride, aconitic anhydride and itaconic anhydride. Suitable esters are, for example, the half esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. Preferably, about 3 to 15% unsaturated polycarboxylic acid, anhydride or esters thereof, based on the weight of the low viscosity polyolefin, can be used in the invention.

These modified amorphous polyolefins have a melt viscosity of 1000 to 6000 centipoise at 125° C. and a saponification number of about 5 to about 60, preferably about 10–25, and a Gardner color of 7 or less. As noted hereinbefore, the saponification number can be modified by the amount of unsaturated polycarboxylic component, the reaction temperature and time. It has been observed that the melt viscosity of the modified polyethylene product increases slightly. This increase in melt viscosity may be due to copolymerization of the wax material with maleic anhydride.

One method for the determination of saponification number of maleated amorphous polyolefin is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized 0.10 N KOH in ethyl alcohol. Heat under reflux for 45 min. Cool, and add from a buret standardized 0.10 N CH$_3$COOH in xylene until the mixture is acid to phenolphthalein. Add at least 1 ml. excess CH$_3$COOH. Reheat the solution under reflux for 15 min. Remove from heat, add 5 ml. water, and titrate to a faint pink end point with 0.10 N KOH in ethyl alcohol. Run a blank in this manner using the same amounts of reagents and the same heating times.

Calculation:

$$\frac{\text{(for sample)}}{[(\text{ml. KOH} \times N) - (\text{ml. CH}_3\text{COOH} \times N)]}{\text{g. Sample}} \times$$

$$56.1 - \frac{\text{(for blank)}}{[(\text{ml. KOH} \times N) - (\text{ml. CH}_3\text{COOH}) \times N] \times 56.1}{\text{g. Sample}} =$$

Sap. No.

The unreacted, unsaturated polycarboxylic acid can be separated from the reaction mixture by purging the reaction mixture with an inert gas while the melt temperature is between 200° and 300° C. After the unreacted unsaturated polycarboxylic acid has been removed, the modified poly-α-olefin can be further purified by vacuum stripping, solvent extraction, or dissolving in a suitable solvent and isolated by removing the solvent.

The modified amorphous polyolefin is then partially neutralized with tetra lower alkyl ammonium hydroxide to form active initiator sites for further reaction with pivalolactone.

The modified amorphous polyolefin could be completely neutralized and would provide similar results by the addition of the tetra lower alkyl ammonium hydroxide. The tetra lower alkyl ammonium hydroxide for such complete neutralization would increase the expense without a definitive increase in result. Therefore, only partial neutralization is necessary to provide the grafting sites necessary for the addition reaction with the pivalolactone. Moreover, the extent of partial neutralization necessary is dependent on the degree of grafting which is to be made with pivalolactone. The tetra lower alkyl ammonium hydroxide can be any tetraalkyl ammonium hydroxide where the alkyl groups contain 1 to 10 carbon atoms. Such tetraalkyl ammonium hydroxides include tetramethyl ammonium hydroxide, tetrabutyl ammonium hydroxide and the like. The partially neutralized acid modified amorphous polyolefin is then reacted with pivalolactone to yield grafted amorphous polyolefins.

The ring and ball softening points (RBSP) and DSC melting points of the grafted amorphous polyolefins increased with increasing amounts of grafted pivalolactone. The RBSP of a 7.5 percent grafted pivalolactone composition was 114° C. That of a 33.3 percent pivalolactone grafted composition was 204° C. Tensile strength also increased with increasing amounts of grafted pivalolactone. The tensile strength of a 7.5 percent pivalolactone grafted copolymer was 130 psi. That of a 33.3 percent pivalolactone composition was 504 psi. In contrast to the above properties, melt viscosity did not change significantly with increasing amounts of grafted pivalolactone.

In addition to the above listed components, it is desirable for the hot-melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 220 and 330 [tris(di-t-butyl-p-hydroxybenzyl)-trimethylbenzene], Dalpac 4C2 [6-di(t-butyl)-p-cresol], Naugawhite (alkylated bisphenol), Butyl Zimate (zinc dibutyl dithiocarbamate), and Ethyl 702 [4,4'-methylene bis(2,6-di-tert-butylphenol)]. A particularly effective antioxidant is Irganox 1010 which is identified as tetrakis[methylene-3-(3',5'-di-t-butyl-4'hydroxyphenyl)propionate]methane when used in combination with Cyanox 1212 (American Cyanamid) which is laurylstearyl thiodipropionate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Grafting Crotonic Acid Onto Amorphous Polypropylene

A 2 liter resin flask fitted with an anchor stirrer, metal thermometer, and N$_2$ bubbler was charged with 1,087 grams of amorphous polypropylene having a melt viscosity of about 1700 cp. at 190° C. and a Ring and Ball softening point of about 100° C. The polymer was melted and heated with stirring under N$_2$ to 180° C. One hundred grams of crotonic acid was added in one charge. The temperature decreased to 160° C. Thirty-five grams of di-tertiary-butyl peroxide was added dropwise over three hours with rapid stirring. The polymer was stripped with N$_2$ for three hours to remove unreacted crotonic acid. It had a melt viscosity at 190° C. of 663 cp and an acid number of 11.7.

Grafting Pivalolactone Onto Crotonic Acid-Modified Amorphous Polypropylene

The following example illustrates a pivalolactone grafting reaction onto crotonic acid-modified amorphous polypropylene.

One hundred fifty grams of 11.7 acid number crotonic acid-grafted amorphous polypropylene was dissolved in 1,200 milliliters of benzene in a 3 liter flask fitted with stirrer, thermowell, condenser, $N_2$ bubbler, and a Dean-Stark trap.

Eighteen milliliters of 0.87 N tetrabutylammonium hydroxide in methanol was added at 60° C. to the reaction vessel to neutralize 50 percent of the acid groups. The temperature was increased to reflux to azeotrope water and remove methanol. The contents of the flask were cooled to 60° C. Four hundred milliliters of tetrahydrofuran was added to solvate the tetrabutylammonium carboxylate groups. Thirty-seven and four-tenths grams of pivalolactone monomer was added. The contents of the flask were heated to reflux. The viscosity of the reaction mixture increased significantly as the polymerization proceeded. The reaction mixture was cooled and 5 milliliters of concentrated HCl in 50 milliliters of tetrahydrofuran was added to the reaction vessel to convert the acid salts to carboxylic acid groups. Polymer was precipitated by adding the reaction mixture to excess methanol. The product was filtered, washed three times with methanol in a blender, stabilized with 0.5 percent Irganox 1010, and dried overnight in a vacuum oven.

The graft copolymer was obtained in 99 percent yield. It had a DSC melting point of 181° C., a ring and ball softening point of 181° C., and a melt viscosity at 190° C. of 1,100 cp.

These compositions consist of polypivalolactone side chains grafted onto an amorphous polypropylene backbone. The average degree of polymerization, $\overline{DP}_{pvl}$, of the polypivalolactone grafted side chains and the average number of polymerized propylene repeating units, $\overline{DP}_{C3H6}$, between any two grafted polypivalolactone side chains can be calculated using the following equations:

$$\overline{DP}_{pvl} = \frac{W_{pvl}}{I \times 100}$$

$$\overline{DP}_{C3H6} = \frac{W_{C3H6}}{N \times 42}$$

where:
- $W_{pvl}$ = Weight of pivalolactone monomer charged in grams.
- $W_{C3H6}$ = Weight of acid modified amorphous polypropylene used in grams.
- I = Equivalents of initiating sites available for polymerization of pivalolactone. This includes both carboxylate anions and carboxyl groups since chain transfer of the propogating carboxylate anion to a carboxyl group occurs rapidly.
- N = Total equivalents of acid sites present on the amorphous polypropylene.
- 100 and 42 are the molecular weights of polypivalolactone and polypropylene repeating units, respectively.

The values obtained for $\overline{DP}_{pvl}$ and $\overline{DP}_{C3H6}$ are average values only. In Example 1 the numerical values for $\overline{DP}_{pvl}$ is 12 and for $\overline{DP}_{C3H6}$ the value is 114.

Additional graft modified copolymer compositions prepared by a similar procedure are given in Table I.

Tensile specimens of the graft modified copolymers were cast from the melt. Tensile properties are given in Table II.

Adhesive properties of the graft modified polyolefins are given in Table III. The data in Table III shows that as the amount of grafted pivalolactone is increased there is a corresponding increase in the elevated temperature shear value.

Table I

Grafting of Pivalolactone onto Crotonic Acid-Modified Amorphous Polypropylene

| Runs | Percent Crotonic Acid-Grafted Amorphous Polypropylene | Percent Pivalolactone | $\overline{DP}_{C3H6}$ | $\overline{DP}_{pvl}$ | Melting Point, °C. (by DSC) | Ring and Ball Softening Point, °C. | Melt Viscosity at 190° C. cp. |
| --- | --- | --- | --- | --- | --- | --- | --- |
| 1 | 92.5 | 7.5 | 114 | 4 | None | 114 | 825 |
| 2 | 89 | 11 | 114 | 6 | 134 | 163 | 800 |
| 3 | 85.5 | 14.5 | 114 | 8 | 175 | 163 | 900 |
| 4 | 80 | 20 | 114 | 12 | 181 | 181 | 1100 |
| 5 | 75 | 25 | 114 | 16 | 190 | 198 | — |
| 6 | 66.6 | 33.3 | 114 | 24 | 204 | 204 | — |

Table II

Tensile Strengths of Pivalolactone-Grafted Amorphous Polypropylene

| Runs | Percent Crotonic Acid-Grafted Amorphous Polypropylene | Percent Pivalolactone | Ultimate Tensile Strength psi |
| --- | --- | --- | --- |
| 1 | 66.6 | 33.3 | 504 |
| 2 | 75 | 25 | 404 |
| 3 | 80 | 20 | 328 |
| 4 | 85.5 | 14.5 | 260 |
| 5 | 92.5 | 7.5 | 130 |
| 6 | Amorphous Polypropylene Control | | 50 |

Table III

Adhesive Properties of Pivalolactone Grafted Amorphous Polypropylene

| Runs | Percent Crotonic Acid-Grafted Amorphous Polypropylene | Percent Pivalolactone | Room Temperature Peel, g. (a) | Elevated Temperature Peel, °F. (b) | Elevated Temperature Shear, °F. (c) |
| --- | --- | --- | --- | --- | --- |
| 1 | 92.5 | 7.5 | 504 | 94 | 192 |
| 2 | 85.5 | 14.5 | 549 | 94 | 264 |
| 3 | 80.0 | 20.0 | 534 | 94 | 348 |
| 4 | 75.0 | 25.0 | 400 | 94 | 380 |

Table III-continued

| | Adhesive Properties of Pivalolactone Grafted Amorphous Polypropylene | | | | |
|---|---|---|---|---|---|
| Runs | Percent Crotonic Acid-Grafted Amorphous Polypropylene | Percent Pivalolactone | Room Temperature Peel, g. (a) | Elevated Temperature Peel, °F. (b) | Elevated Temperature Shear, °F. (c) |
| 5 | 66.6 | 33.3 | 240 | 94 | 404 |

(a) Test Method ECD-A-PG-G-PTM-1110-1
(b) Test Method ECD-A-PC-G-PTM-2070-1
(c) Test Method ECD-A-PC-G-PTM-2073-1
These test methods are modifications of standard test procedures, which specific test methods were published in 1974 and are available from Eastman Chemical Products, Inc., P. O. Box 431, Kingsport, Tennessee 37662.

Similar results are obtained by using a different amorphous polyolefin such as ethylene/propylene amorphous polyolefin containing less than 10 percent ethylene or an amorphous polypropylene containing up to 30 weight percent crystalline hexane insoluble polyolefin for the amorphous polypropylene of Example 1. Similar results are also obtained using different unsaturated acid components such as maleic acid or anhydride for crotonic acid and different free-radical initiator for di-tertiary butyl peroxide. Further, the use of other tetra alkyl carboxylic acid components in place of tetrabutylammonium hydroxide also provides similar results.

The composition of this invention are useful hot melt adhesives for packaging and product assembly, especially where high elevated temperature shear is desirable. They would also be useful as palletizing adhesives, particularly for use in hot warehouses.

Although the invention has been described in considerable detail with particular reference to certain preferred embodiments thereof, variations and modifications can be effected within the spirit and scope of the invention.

I claim:

1. A grafted modified polyolefin hot-melt adhesive prepared by reacting an amorphous polyolefin having a melt viscosity of about 1,000 to about 50,000 centipoise at 190° C. and a Ring and Ball softening point of about 90 to about 110, with at least one unsaturated alkyl carboxylic acid component in the presence of a free-radical initiator to provide modified amorphous polyolefins having a melt viscosity of about 1000 to 6000 centipoise at 125° C. and a saponification number of about 5 to about 60, partially neutralizing said modified amorphous polyolefin with tetra lower alkyl ammonium hydroxide and thereafter reacting said partially neutralized modified polyolefin with from about 5 to about 40 percent by weight pivalolactone to provide a hot-melt polyolefin adhesive having elevated temperature shear properties.

2. A grafted modified polyolefin hot-melt adhesive according to claim 1 wherein said amorphous polyolefin is amorphous polypropylene.

3. A grafted modified polyolefin hot-melt adhesive according to claim 2 wherein said unsaturated alkyl carboxylic acid component is crotonic acid.

4. A grafted modified polyolefin hot-melt adhesive according to claim 3 wherein said tetra lower alkyl ammonium hydroxide is tetrabutylammonium hydroxide.

5. A grafted modified polyolefin hot-melt adhesive according to claim 4 wherein said modified amorphous polyolefin has a saponification number of about 10 to about 25.

6. A grafted modified polyolefin hot-melt adhesive according to claim 2 wherein said amorphous polypropylene has a melt viscosity of from about 1,500 to about 15,000 centipoise at 190° C. and a Ring and Ball softening point of about 95 to about 105.

7. A grafted modified polyolefin hot-melt adhesive according to claim 6 wherein said unsaturated alkyl carboxylic acid component is crotonic acid.

8. A grafted modified polyolefin according to claim 7 wherein said tetra lower alkyl ammonium hydroxide is tetrabutylammonium hydroxide.

9. A grafted modified polyolefin hot-melt adhesive according to claim 8 wherein said modified amorphous polyolefin has a saponification number of about 10 to about 25.

10. A grafted modified polyolefin according to claim 6 wherein said amorphous polypropylene has a melt viscosity of about 1,700 centipoise at 190° C. and a Ring and Ball softening point of about 100° C.

11. A grafted modified polyolefin according to claim 10 wherein said unsaturated alkyl carboxylic acid component is crotonic acid.

12. A grafted modified polyolefin according to claim 11 wherein said tetra lower alkyl ammonium hydroxide is tetrabutylammonium hydroxide.

13. A grafted modified polyolefin hot-melt adhesive according to claim 12 wherein said modified amorphous polyolefin has a saponification number of about 10 to about 25.

* * * * *